Figure 1:
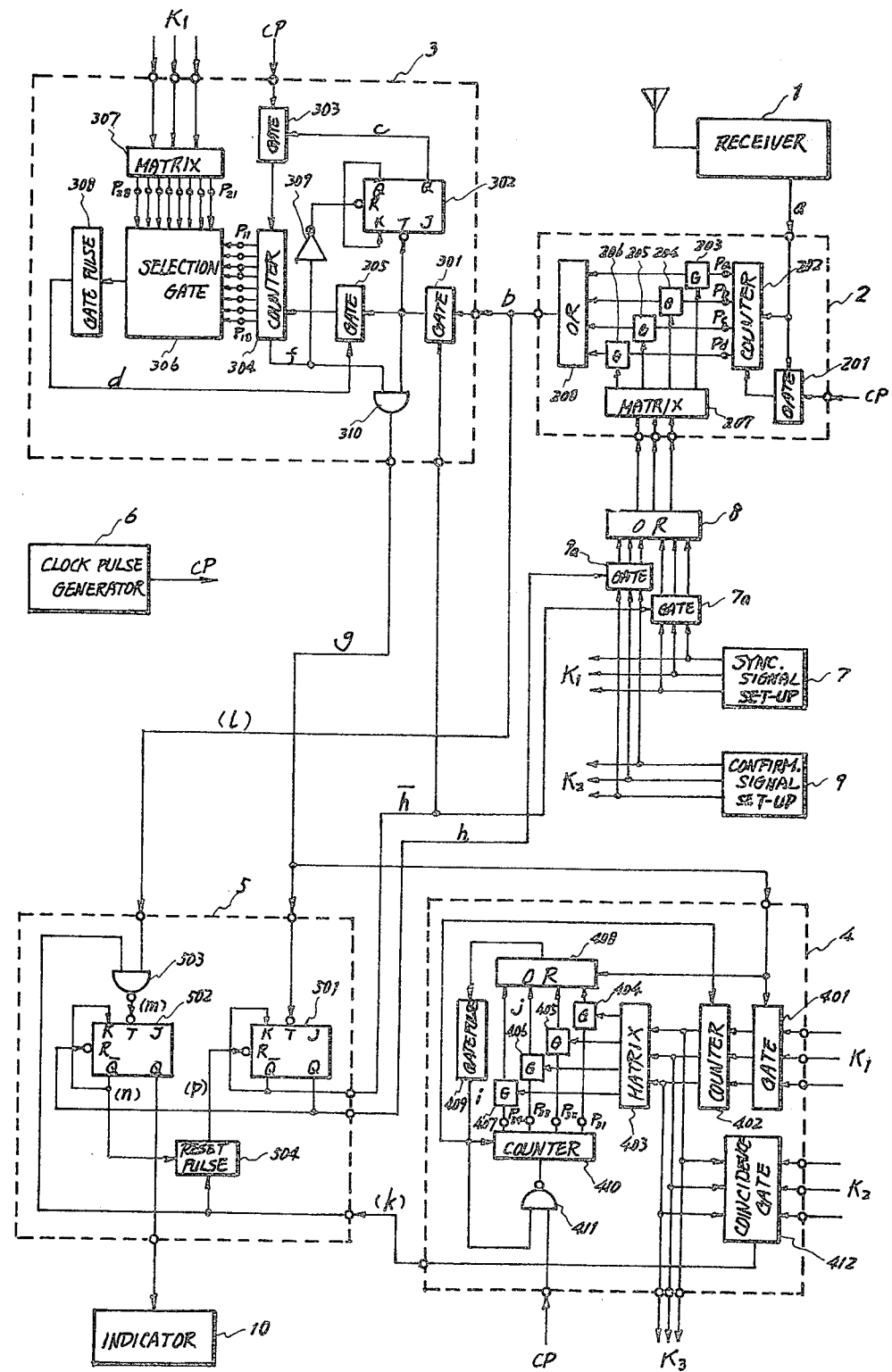

# United States Patent
Tanaka et al.

[11] 3,889,265
[45] June 10, 1975

[54] STATION DISTINGUISHING SYSTEM IN OMEGA RECEIVER

[75] Inventors: Hideki Tanaka; Kazutaka Ishida, both of Osaka; Mikio Watanabe, Kobe; Mitsuhiro Inouchi, Nishinomiya; Shigeru Yoshioka, Kobe; Minoru Handa, Ikoma; Asao Kitabatake, Kakogawa, all of Japan

[73] Assignee: Furuno Electric Company, Limited, Japan

[22] Filed: Apr. 12, 1974

[21] Appl. No.: 460,365

[52] U.S. Cl. .................. 343/105 R; 178/69.5 R
[51] Int. Cl. .................................. G01s 1/30
[58] Field of Search ............ 343/105 R; 178/69.5 R

[56] References Cited
UNITED STATES PATENTS
3,069,504  12/1962  Kaneko .......................... 178/69.5 R
3,761,932  9/1973  Fujimoto ......................... 343/105 R

*Primary Examiner*—Richard A. Farley
*Assistant Examiner*—Richard E. Berger

[57] ABSTRACT

A station distinguishing system for an omega navigation system which includes signal receiving means, measuring the duration of each received signal and selecting the signals having durations corresponding to the duration of a selected station, generating wave forms of durations corresonding to the durations of the signals of the transmitting stations, and a confirming device for confirming that a signal produced by the generating means corresponds in time and duration to the selected station thus distinguishing the desired signal from the signals produced by the selecting means.

6 Claims, 2 Drawing Figures

STATION DISTINGUISHING SYSTEM IN OMEGA RECEIVER

This invention relates to a station distinguishing system which is effectively applicable to an omega navigation system.

In omega navigation, a navigating body, such as a ship, receives omega signals from omega transmitting stations, compares them to measure the phase differences therebetween and detects its position from the phase differences. As the omega signals are transmitted from eight stations respectively at a same frequency in time division fashion, it is necessary to select the omega signals from the required transmitting stations.

As the omega transmitting stations are arranged to send out their omega signals respectively at predetermined times based upon the world standard time, it may be possible to distinguish the stations based upon the standard time. However, this method is inconvenient and not particularly useful in practice because the transmitting time of the each station is so short (about one second) that a highly reliable clock device must be employed.

Therefore, an object of this invention is to provide a novel and improved station distinguishing system is an omega receiving device, which can readily distinguish the stations without using the standard time and, accordingly, the expensive clock device.

According to this invention, the station selection is effected by utilizing the transmitting time of the each station. The station distinguishing system of this invention comprises an omega signal receiving device for receiving the omega signals transmitted from the omega transmitting stations at the same frequency in time division fashion and producing a set of envelope waveforms therof, a selection device for counting the duration of each of said envelope waveforms to select out the envelope waveforms having the duration of the envelope waveform corresponding to a required transmitting station, an envelope waveform generating device for generating a set of waveforms (for example, envelope waveforms) representing the respective transmitting stations based upon the envelope waveform of any station output from said selection device, at the time points corresponding to the transmitting time of the respective stations based upon said required station in the same order as the omega signals transmitted in time division fashion, and a confirming device for confirming that a waveform of an arbitrary station selected from the output of said envelope waveform generating device coincides in time with an envelope waveform selected from the output of said receiving device and having the same duration as the envelope waveform of said arbitrary station, thereby distinguishing the signal from said required station from the envelope waveforms sent out from selection device.

Other features and operation of the system of this invention will be described in more detail hereinunder with reference to the accompanying drawings.

Figure 2:
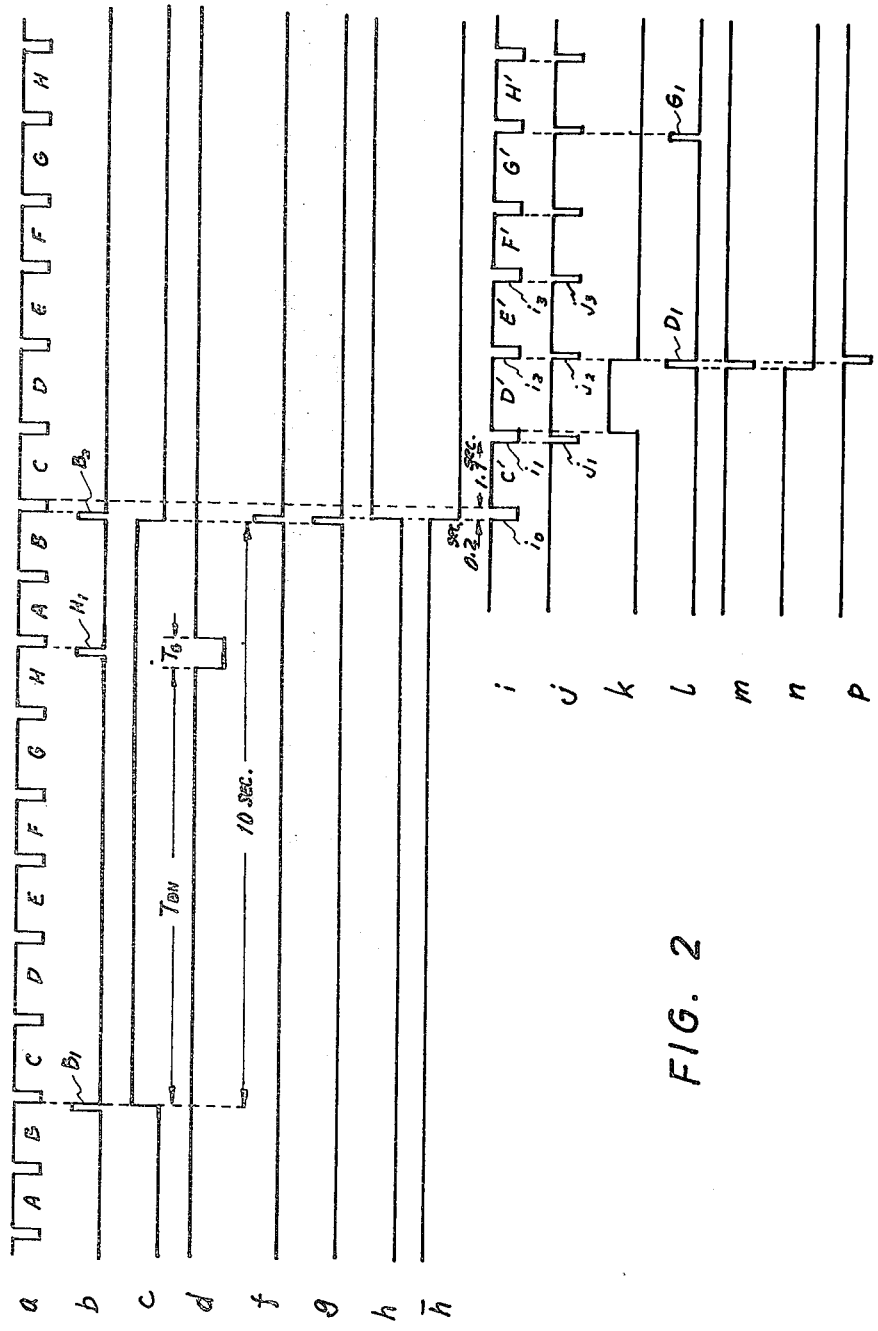

In the drawings:

FIG. 1 is a schematic circuit diagram representing an embodiment of the system of this invention; and FIG. 2 is a waveform diagram that is used as an aid in explaining the operation of the system of FIG. 1.

Now, an assumption will be made that eight omega transmitting stations A, B, C, . . . H are arranged to transmit their signals for 0.9, 1.0, 1.1, 1.2, 1.1, 0.9, 1.2 and 1.0 second respectively with an interruption of 0.2 second each therebetween as shown in FIG. 2(a) and, therefore, the signal from the each station is repeated at a period of 10 seconds. Accordingly, the stations can be roughly estimated from the durations of the received signals. For example, if the duration of the received signal is measured as 1.0 second, the station which sent this signal must be B or H. And, if it is B, the signal from Station F must be received after 4.0 seconds from the reception of this signal. If it is H, the signal from Station D must be received after 3.6 seconds. Therefore, discrimination of the two stations can be made by receiving another signal from the other station after a predetermined time period.

Referring to FIG. 1, the omega signals received from the eight transmitting stations in time division fashion are converted into a train of envelope waveforms as shown in FIG. 2(a) by a receiver 1 and supplied to a selection device 2. From these envelope waveforms, the selection device 2 selects those having a duration equal to that of the station which is previously stored in coded form in a synchronous signal set-up circuit 7. When Station B is stored, for example, the selection device 2 selects Stations B and H and produces a signal indicating both stations as shown in FIG. 2(b). This signal is supplied to a discrimination device 3 and Station B is distinguished therein from Station H, thereby producing an output indicating Station B, as shown in FIG. 2(g). Based upon this output, a set of envelope waveforms initiating from B and circulating in the order of B, C, D, . . . H and A as shown in FIG. 2(i) is produced by an envelope waveform generating device 4. Further, based upon this set of waveforms, a confirmation device 5 confirms that the waveform of a station which is previously stored in coded form in a confirmation signal set-up circuit 9 has been received after a predetermined time from the reception of the waveform of Station B. This is the outline of the configuration and operation of the system of this invention and a detailed explanation thereof will be given below.

The train of envelope waveforms (a) is applied as a control signal to a gate circuit 201 to which a train of clock pulses CP is supplied from a clock pulse generator 6, and opens it for a time period corresponding to the duration of each waveform to pass the clock pulses CP to a counter circuit 202. Thus, the counter circuit 202 counts the duration of each envelope waveform and produces an output from one of the output terminals Pa, Pb, Pc and Pd in accordance with the count obtained when the counter is reset by the trailing edge of each waveform. For example, these output terminals correspond as follows.

| Terminal | Duration | Station |
| --- | --- | --- |
| Pa | 0.9 sec. | A or F |
| Pb | 1.0 sec. | B or H |
| Pc | 1.1 sec. | C or E |
| Pd | 1.2 sec. | D or G |

The outputs of the counter 202 from these output terminals are respectively gated by gate circuits 203, 204, 205, and 206 to which the output of the synchronous signal set-up circuit 7 is applied through a gate circuit 7a and an OR circuit 8. Based upon the previous set up of the circuit 7 with the required station, the circuit 7 produces a coded output. The matrix circuit 207 is arranged to control one of the gate circuits 203 and 206 in accordance with the coded signal from the synchronous signal set-up circuit 7. The stations, codes and controlled gates are predetermined as follows, for instance.

| Stations | Codes | Controlled Gates |
| --- | --- | --- |
| A | 000 | 203 |
| B | 001 | 204 |
| C | 010 | 205 |
| D | 011 | 206 |
| E | 100 | 205 |
| F | 101 | 203 |
| G | 110 | 206 |
| H | 111 | 204 |

Therefore, when Station B is stored in the synchronous signal set-up circuit 7, the gate circuit 204 is opened and passes the counter outputs obtained when the wavefroms of Stations B and H are counted, as shown by the waveform (b) of FIG. 2. The output of the counter circuit 202 is thus gated and supplied through an OR circuit 208 to the discrimination circuit 3.

In the discrimination circuit 3, the signal (b) is supplied through a gate circuit 301 to the T-terminal of a JK Flip-flop circuit 302 to invert it. As the $\overline{Q}$-terminal of the flip-flop 302 is coupled back to its K-terminal, it can not be inverted again unless it is reset, if it is once inverted. The JK flip-flop 302 is inverted by a pulse $B_1$ in the waveform (b) which indicates the reception of the signal from Station B and produces an output as shown by (c) in FIG. 2 from its Q-terminal. The Q-output of the flip-flop 302 is applied to a gate circuit 303 as a control signal to pass the clock pulses CP from the clock pulse generator 6 to a counter circuit 304.

The signal (b) gated by the gate circuit 301 is supplied through a gate circuit 305 to the counter 304 to reset it with the pulse $B_1$. Accordingly, the counter 304 initiates the count of the clock pulses CP from the time of resetting and produces outputs in turn from its output terminals $P_{11}$ to $P_{18}$ corresponding to each count from the initiation of each counting operation. The outputs of the counter 304 are respectively supplied to a selection gate 306 which is constructed similarly to the gate circuits 203 to 206 in the selection device 2 and controlled by the outputs $P_{21}$ to $P_{28}$ of a matrix circuit 307 based upon the coded output of the synchronous signal set-up circuit 7. These circuits are arranged so that the selection gate 306 passes the output which is sent out from the counter 304 when the signal from another station having the same duration as the station which is stored in the synchronous signal set-up circuit 7 is received. For example, when Station B is stored in the circuit 7, the gate 306 produces an output when the signal is received from Station H. The output from the selection gate 306 is supplied to a gate pulse generating circuit 308 to produce therefrom a gating pulse, as shown by (d) in FIG. 2, having at least a duration $T_G$ which can include a pulse $H_1$ in the waveform (b), and indicates the reception of the signal from Station H. The gating pulse (d) is applied to the gate circuit 305 to close it for the time $T_G$. Therefore, when the counter circuit 304 initiated its counting operation based upon the selection pulse B of Station B, the selection pulse $H_1$ of Station H, which is included in the time $T_G$, is blocked by the gate 305 and the counter circuit 304 is reset by the next selection pulse $B_2$ of Station B. However, when the counting operation was initiated based upon the selection pulse $H_1$ of Station H, the selection pulse $B_2$ of Station B appears out of the time $T_G$, and, therefore, passes the gate circuit 305 to reset the counter circuit 304. Consequently, the counter circuit 305 tends to initiate its counting operation based upon the selection pulse of a station previously stored in the synchronous signal set-up circuit 7, at any time.

The counter circuit 304 is arranged to produce an output pulse as shown by (f) of FIG. 2 after ten seconds from the initiation of the counting operation. The output pulse (f) is applied through a NOT circuit 309 to the R-terminal of the JK flip-flop circuit 302 to reset it and, at the same time, compared with the selection waveform (b) at an AND circuit 310. When the flip-flop 302 is reset, the Q output (c) goes down to its Low-level to close the gate circuit 303 to stop the counting operation of the counter circuit 304.

On the other hand, the AND circuit 310 comparing the waveforms (b) and (f) produces a coincidence pulse as shown by (g) in FIG. 2 when the output pulse (f) of the counter circuit 304 coincides in time with the second selection pulse $B_2$ of Station B. The coincidence pulse (g) is applied to the T-input of a JK flip-flop circuit 501 of the confirmation device 5 to invert this flip-flop and the $\overline{Q}$-output as shown by ($\overline{h}$) in FIG. 2 is applied to the gate circuit 301 of the discrimination device 3 to close it. That is, the discrimination device 3 stops its operation when the coincidence pulse (g) is produced. However, when the coincidence pulse (g) is not produced, specifically when the selection pulses $B_1$ and $B_2$ do not appear at intervals of ten seconds for some cause, the selection waveform (b) passes the gate circuit 301 to drive the discrimination device 3. This operation of the device 3 is continued until the coincidence pulse (g) is produced.

The coincidence pulse (g) is also applied as a control pulse to a gate circuit 401 of the envelope waveform generating device 4, to which the coded signal $K_1$ is supplied from the synchronous signal set up circuit 7. The coded signal $K_1$ is supplied to a counter circuit 402 when the gate circuit 401 is opened by the coincidence pulse (g). The counter circuit 402 is an octimal counter circuit composed of a binary counter of three digits and the numerical values of the respective digits are set up to be equal to those of the coded signal $K_1$. The count output of the counter circuit 402 is applied to a matrix circuit 403 and the matrix circuit 403 opens one of gate circuits 404, 405, 406 and 407 based upon the count output of the counter circuit 402 in the same fashion as in the case of the matrix 207, as shown in the following table.

| Stations | Codes | Gated |
| --- | --- | --- |
| A | 000 | 404 |
| B | 001 | 405 |
| C | 010 | 406 |
| D | 011 | 407 |
| E | 100 | 406 |
| F | 101 | 404 |
| G | 110 | 407 |
| H | 111 | 405 |

The coincidence pulse (g) is further applied through an OR circuit 408 to a gate pulse generating circuit 409. The circuit 409 is arranged to produce a control pulse having a duration of 0.2 second, for example, as shown by $i_0$ in FIG. 2(i). The control pulse $i_0$ is applied to the counter circuit 402 to raise its count by one. Therefore, when Station B is stored in the synchronous signal set-up circuit 7, the count of the counter circuit 402 is set up first as 001 which represents Station B and then raised by the control pulse $i_0$ to 010 which represents Station C. The control pulse $i_0$ is also applied to a counter circuit 410 and a NAND circuit 411. The counter circuit 410 is reset by the control pulse $i_0$ and counts the clock pulses CP supplied through the NAND circuit 411 from the clock pulse generator 6. As the NAND circuit 411 blocks the supply of clock pulses to the counter circuit 410 for a time corresponding to the duration of the control pulse $i_0$, that is, for 0.2 second in this case, the counter circuit 410 initiates its counting operation after 0.2 second from its resetting. The counter circuit 410 is arranged to produce outputs from its output terminals $P_{31}$, $P_{32}$, $P_{33}$, and $P_{34}$ when it has counted out 0.9 second, 1.0 second, 1.1 second and 1.2 second, respectively. As the count of the counter 410 has been raised to 010 in this case, the gate circuit 406 is opened and the output from the terminal $P_{33}$ is passed therethrough. This output is a pulse $j_1$ which appears 1.1 seconds after the pulse $i_0$, as shown in FIG. 2(j). The pulse $j_1$ is applied through the OR circuit 408 to the gate pulse generating circuit 409 and the circuit 409 produces a control pulse $i_1$ (FIG. 2(i)) having a duration of 0.2 second and appearing 1.1 second after the control pulse $i_0$. This control pulse $i_1$ raises the count of the counter circuit 402 by one and, at the same time, resets the counter circuit 410, as effected by the control pulse $i_0$. The counter circuit 410 initiate again its counting operation after 0.2 second and the operation of the circuit is similarly repeated, thereby producing a train of control pulses $i_0, i_1, i_2, i_3, \ldots$ having the same duration of 0.2 second and appearing in coincidence in time with the receptions of the signals from Stations B, C, D, E, .... respectively. It is readily understood that the waveform (i) is a replica of the waveform (b).

The code signals representing the respective stations and sent out in order from the counter circuit 402 are successively supplied to a coincidence gate circuit 412 and compared with a code signal $K_2$ supplied from a confirmation signal set-up circuit 9. When the both coded signals coincide, the gate circuit 412 produces an output of high level. For instance, when Station D is preset in the confiramtion signal set-up circuit 9, the gate circuit 412 forwards a pulse as shown by (k) in FIG. 2 to the confirmation device 5 when the count output of the counter 402 becomes 011.

In the confirmation device 5, the Q-output and $\overline{Q}$-output of the JK flip-flop 501 are inverted by the coincidence pulse (g) and maintains the inverted state as shown by waveforms (h) and ($\overline{h}$) in FIG. 2 because the $\overline{Q}$-output is coupled back to the K-terminal. The Q output (h) of the flip-flop 501 is applied also to a gate circuit 9a to open it and, at the same time, to the reset terminal R of another JK flip-flop 502. The $\overline{Q}$-output ($\overline{h}$) of the JK flip-flop 501 is also applied to the gate circuit 7a and the gate circuit 301 in the discrimination device 3 to close them. Therefore, the code signal $K_2$ of the confirmation signal set up circuit 9 is forwarded through the gate circuit 9a to the selection device 2 after the JK flip-flop 501 is inverted. Specifically, when Station D is preset in the confirmation signal set up circuit 9, such a waveform as shown in FIG. 2(l) including two pulses $D_1$ and $G_1$ which appear in coincidence with the reception from Stations D and G have the same signal duration 1.2 second. These pulses $D_1$ and $G_1$ are compared with the waveform (k) at a NAND circuit 503 and the NAND circuit produces an output pulse as shown by (m) in FIG. 2 when the selection pulse $D_1$ is included in the duration of the pulse (k). The output pulse (m) is applied to the T-terminal of the flip-flop 502 to invert it. The $\overline{Q}$-output (n) (FIG. 2) is applied to a reset pulse generating circuit 504 and the reset pulse generating circuit 504 stops operation in response to the Low level of the $\overline{Q}$-pütput (n).

The reset pulse generating circuit 504 is arranged to produce a reset pulse as shown in FIG. 2(p) in response to the trailing edge of the waveform (k) when the $\overline{Q}$-output of the flip-flop 502 is at the high level, that is, when the flip-flop 502 is not inverted. When the selection pulse $D_1$ of Station D does not coincide with the pulse (k) from the coincidence gate 412 of the envelope waveform generating device 4, the pulse (m) is not obtained and the flip-flop 502 can not be inverted. Therefore, the reset pulse generating circuit 504 continues to be driven and produces a reset pulse (p) in response to the trailing edge of the waveform (k), which is applied to the reset terminal R of the flip-flop 501 to reset it. When the flip-flop 501 is reset, the Q-output becomes the low level and the $\overline{Q}$-output becomes the high level, and the gate circuit 7a is opened and the gate circuit 9a is closed. Thus, the coded signal $K_1$ from the synchronous signal set-up circuit 7 is supplied to the selection circuit 2 and the operation of the system is effected based upon this signal $K_1$. This operation is continues until the selection pulse (1) comes in the duration of the pulse (k) and the JK flip-flop 502 is inverted.

Consequently, the counter circuit 402 of the envelope waveform generating device 4 tends to produce the coded signals of the respective stations successively in coincidence with the transmitting time points of the stations.

As described above, the system of this invention can select the signal from a required station by utilizing the signal durations of the respective stations. In addition, it is arranged to confirm that the selected station is the required station, so that the selection of the station is very reliable.

When the coded signals of the respective stations produced by the counter circuit 402 of the envelope waveform generating device 4 coincide with the transmitting times of the stations, the JK flip-flop 502 is inverted and thereafter maintained as it is. Therefore, it is possible to provide an indication of the completion of station distinction on an indicator 10 based upon the high level of the Q output of the flip-flop.

As readily understood from the above description, the confirmation device 5 is not an essential component of this system and may be omitted for simplification and cost reduction. Without the confirmation device 5, the signals (h) and (h) are never produced and, therefore, the discrimination device 3 constantly continues its operation and a train of code signals $K_3$ of the respective stations is produced repeatedly by the envelope waveform generating device 4. According to this code signal train $K_3$, any station can be selectd as occasion demands.

Further, if it is desired to distinguish only a single station, such as Station B, from the other stations, it is only necessary to produce the reference signal (g). For this purpose, therefore, the envelope waveform generating device 4 may be omitted. Such omissions and additions of the components may be made in accordance with the use of this system.

We claim:

1. A station distinguishing system for selecting a signal of a required transmitting station from the omega signals transmitted by the omega transmitting stations in time division fashion, comprising means for receiving said omega signals and producing a first train of envelope waveforms of said omega signals in the order of reception, means for selecting a pair of envelope waveforms having a duration corresponding to said required station out of said envelope waveforms and producing a pair of selection signals corresponding to said pair of envelope waveforms, and means for distinguishing one of said selection signals which corresponds to said required station and producing a reference signal which corresponds to said required station.

2. The system according to claim 1, wherein said means for selecting a pair of envelope wavefroms includes a counting unit for counting clock pulses for the durations of said envelope waveforms and producing outputs representing said durations and gating means for passing one of said outputs which represent the duration of said required station based upon a coded signal corresponding to said required station.

3. The system according to claim 1, wherein said means for distinguishing said selection signals includes a counting unit for counting clock pulses from the starting time of one of said selection signals for a time corresponding to the time interval between said pair of envelope waveforms having the same duration and producing a distinction signal at the time of the other selection signal, gating means for blocking said other selection signal in response to said distinction signal, thereby causing the counting operation of said counting unit to be initiated only at the time of said one selection signal, said counting unit also producing an interval signal after a lapse of time corresponding to the transmission interval of the each transmitting station, and means for comparing said interval signal with said selection signals and producing said reference signal when a coincidence is obtained therebetween.

4. The system according to claim 1, wherein said system further comprises means for producing a second train of envelope waveforms corresponding respectively to said first train of envelope waveforms based upon said reference signal, said second train of waveforms appearing in the same order as said first train of waveforms and starting from said required station.

5. The system according to claim 4, wherein said means for producing a second train of envelope waveforms includes a counting unit for counting clock pulses in response to said reference signal and producing outputs corresponding to the durations of said envelope waveforms, and means for gating said outputs in the order of stations received, under control of the coded signals of said stations.

6. The system according to claim 4, wherein said system further comprises means for confirming that a waveform of an arbitrary station in said second train of envelope waveforms appears in coincidence in time with a waveform in said first train of envelope waveforms which has the same duration as the envelope waveform of said arbitrary station and producing a confirmation signal.

* * * * *